(12) United States Patent
Gariepy et al.

(10) Patent No.: US 9,396,324 B1
(45) Date of Patent: Jul. 19, 2016

(54) SYSTEM AND METHOD FOR EXTENDING PASSWORD TIME-TO-LIVE BASED ON CHARACTERISTICS OF PROPOSED PASSWORD

(71) Applicant: NetSuite Inc., San Mateo, CA (US)

(72) Inventors: Neil David Gariepy, Redwood City, CA (US); Christopher Thomas Blum, San Mateo, CA (US); Elham Ghassemzadeh, San Jose, CA (US)

(73) Assignee: NetSuite Inc., San Mateo, CA (US)

( * ) Notice: Subject to any disclaimer, the term of this patent is extended or adjusted under 35 U.S.C. 154(b) by 101 days.

(21) Appl. No.: 14/195,700

(22) Filed: Mar. 3, 2014

Related U.S. Application Data

(60) Provisional application No. 61/775,287, filed on Mar. 8, 2013.

(51) Int. Cl.
| | | |
|---|---|---|
| *G06F 21/00* | (2013.01) | |
| *G06F 21/46* | (2013.01) | |
| *H04L 29/06* | (2006.01) | |

(52) U.S. Cl.
CPC ............ *G06F 21/46* (2013.01); *H04L 63/0846* (2013.01)

(58) Field of Classification Search
None
See application file for complete search history.

(56) References Cited

U.S. PATENT DOCUMENTS

| | | | | |
|---|---|---|---|---|
| 2005/0235341 | A1* | 10/2005 | Stieglitz | G06F 21/46 726/5 |
| 2008/0114986 | A1* | 5/2008 | Morris et al. | 713/183 |
| 2010/0031343 | A1* | 2/2010 | Childress et al. | 726/18 |

* cited by examiner

*Primary Examiner* — Ghazal Shehni
(74) *Attorney, Agent, or Firm* — Lane Powell PC

(57) ABSTRACT

Systems and methods for use in enhancing the security of a system, network, device, data storage element, software application, document, account, data, structure or building. Specifically, the invention is directed to a method of determining a password time-to-live (TTL) value for a password created by a user. In one embodiment, the TTL is extended relative to a baseline or default value if the user creates a password that is expected to produce an increased level of security. Such a password may be longer, include a certain combination of characters, be judged as more complex by an appropriate algorithm, rule or heuristic, or be considered as more secure or desirable by using any other suitable measure or criteria.

22 Claims, 2 Drawing Sheets

SYSTEM AND METHOD FOR EXTENDING PASSWORD TIME-TO-LIVE BASED ON CHARACTERISTICS OF PROPOSED PASSWORD

CROSS REFERENCE TO RELATED APPLICATION

This application claims the benefit of U.S. Provisional Application No. 61/775,287, entitled "System and Method for Extending Password Time-To-Live Based on Characteristics of Proposed Password," filed Mar. 8, 2013, which is incorporated herein by reference in its entirety for all purposes.

BACKGROUND

The security of computer systems, computer networks, individual computing devices, and data is an important concern for businesses and individuals. Computing systems and networks are often used to transfer confidential and valuable data between corporations, between corporations and individual users, and between individual users (or groups of users). Such data may be generated by system components and individuals as part of economic transactions, transfers of funds, research and development of innovations and new products, registration for benefits, or the collection of information vital to national security. Similarly, such data may be created and stored using individual computing devices or remote devices (such as servers), and stored using local or remote databases or data storage elements. Because of the potential harm that could be caused by an unauthorized access to a device, network, system, or to the data itself, many types of security and access control protocols have been developed for individual devices, systems, and networks.

One of the most common types of security or access control protocols is a password. A password is typically a string of characters that a user is requested to create in response to a prompt, and then is required to respond with at a later time in order to gain access to a computer, a computing system, a computer network, or other device. A password may also be used to control access to a software application, data storage element, account data, file, folder, or other form of data or device. While typically not the only form of access control (or the strongest), a password is often used as an initial challenge to a user in many situations in which the user desires to gain access to a protected element.

A common feature of password based access control methods is that a password is associated with an expiration event, that is a date, time, number of access attempts, etc. beyond which the password is no longer capable of enabling access. This is typically termed a password's time-to-live (TTL). A password TTL may be set by a system administrator to be a number of hours, a number of days, a number of weeks, or almost any other suitable time measure or number of events. The TTL selected often represents a balance between maximizing security (which would be more likely to occur with a relatively short TTL and hence more frequently changing passwords) and reducing the burden on users, who must create and remember each new password (which burden would be more likely to be reduced with a relatively long TTL; however, note that this presumably would lead to a reduction in security because the password would be more likely to be guessed during that time). For example, a typical TTL for a password to a system or network might be 90 days, so that each user is required to submit a new password every 90 days in order to maintain access to the system.

An additional complication that may result from the competing concerns regarding an appropriate password TTL, is that it may impact the complexity of a password chosen by a user. For example, if the password TTL is relatively short, a user may become frustrated with being required to create and remember a new password so frequently. As a result, the user may create more easily remembered (and hence more easily "guessed") passwords since they are required to create a new one so often. This problem may even arise regardless of the TTL; as long as some users become frustrated with having to create and remember a new password more frequently than they find acceptable, the passwords they create may be less secure than desired by a system administrator. This problem can arise even with the requirement that passwords satisfy one or more criteria (e.g., being of a certain length, including one or more different types of characters, etc.) because a user may continue to use a similar base password to which they add a small variation, or may use a password that is similar to one used previously or in another context. Thus, the very existence of a password TTL may create a disincentive for users to select more complex (and presumably more secure) passwords. In this way a TTL, and particularly a relatively short TTL, may operate to frustrate the very purpose of having a password.

Conventional approaches to determining an appropriate password TTL value have disadvantages that may operate to reduce the security of the device or system for which a password is required. Embodiments of the invention are directed toward solving these and other problems individually and collectively.

SUMMARY

The terms "invention," "the invention," "this invention" and "the present invention" as used herein are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim. This summary is a high-level overview of various aspects of the inventive system and methods.

Embodiments of the invention are directed to systems and methods for use in enhancing the security of a system, network, device, data storage element, software application, document, account, data, or other suitable application of an embodiment of the invention. Specifically, the invention is directed to a method of determining a password time-to-live (TTL) value for a password created by a user. In one embodiment, the TTL is extended relative to a baseline or default value if the user creates a password that is expected to produce an increased level of security. Such a password may be longer, include a certain combination of characters, be judged as more complex by an appropriate algorithm, rule or heuristic, or be considered as more secure or desirable by using any other suitable measure or criteria. A benefit of the invention is that it produces an incentive for users to create what are expected to be more secure passwords by rewarding them with a longer TTL (and hence a reduction in the burden placed on the user to remember a new password every time the previous password expires). This reinforces the purpose of using a password to control access and provide security.

In one embodiment, a user is offered the opportunity to extend their password's TTL value by selecting a longer and/or more complex password. The user may be offered more than one option for an extended password TTL as a function of the length and/or complexity of the proposed new password. For example, if the default password TTL is 90 days for a password of length six characters, then the user may be offered the option of a password TTL of 120 days for a new password of length eight characters, a password TTL of 150 days for a new password of length ten characters, etc. Further, the user may be offered a password TTL option that is based on one or more factors or parameters in addition to (or instead of) the number of characters (such as those which increase the complexity of the password or are otherwise believed to provide enhanced security by reducing the likelihood of an unauthorized person guessing the password). Examples of this option include a longer password TTL if the new password includes a certain type of character, does not include a certain type of character, includes a certain minimum number of different characters, satisfies a certain threshold value when evaluated in terms of its complexity, obtains a certain minimum value when evaluated by a specified algorithm, rule or heuristic, etc.

Note that use of the invention may require that a separate TTL be stored and referred to for each account, as opposed to the current practice of having a standard TTL that is applied to all (or almost all) accounts. Further, the options presented to a user with regards to the password TTL may depend upon the user's role in an organization, the systems or data that the user typically accesses, the TTL suggested by application of a specific algorithm, rule or heuristic (which may vary depending upon the current state of encryption/decryption/coding models, etc.). Thus, the TTL options offered to a specific user may depend upon one or more factors, where these factors may change over time.

In one embodiment, the invention is directed to a method for generating a password for a user to obtain access, where the method includes:

providing the user with one or more options for a time-to-live (TTL) value for the password based on one or more characteristics of a proposed password;

receiving the user's selection of one of the one or more options;

receiving the proposed password;

evaluating the proposed password to determine if it satisfies one or more criteria applicable to the selected option; and if the proposed password satisfies the one or more criteria applicable to the selected option, then setting a password TTL value for the user to the TTL value corresponding to the selected option.

In another embodiment, the invention is directed to an apparatus for generating a password to be used by a user for obtaining access, where the apparatus includes:

a processor programmed to execute a set of instructions;

a data storage element in which the set of instructions are stored, wherein when executed by the processor the set of instructions cause the apparatus to provide the user with one or more options for a time-to-live (TTL) value for the user's password based on one or more characteristics of a proposed password;

receive the user's selection of one of the one or more options;

receive the proposed password for the user;

evaluate the proposed password to determine if it satisfies one or more criteria applicable to the selected option; and if the proposed password satisfies the one or more criteria applicable to the selected option, then setting a password TTL value for the user to the TTL value corresponding to the selected option.

In yet another embodiment, the invention is directed to a method of providing a user with access, where the method includes:

presenting the user with an option to extend a password time-to-live (TTL) value based on the user submitting a proposed password that satisfies one or more criteria;

receiving from the user a selection of the option;

receiving from the user a proposed password;

determining if the proposed password satisfies the one or more criteria;

accepting the proposed password if the proposed password satisfies the one or more criteria;

setting the time-to-live value for the password;

requesting the user to enter their password; and providing the user with access if the password entered in response to the request is the accepted password.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
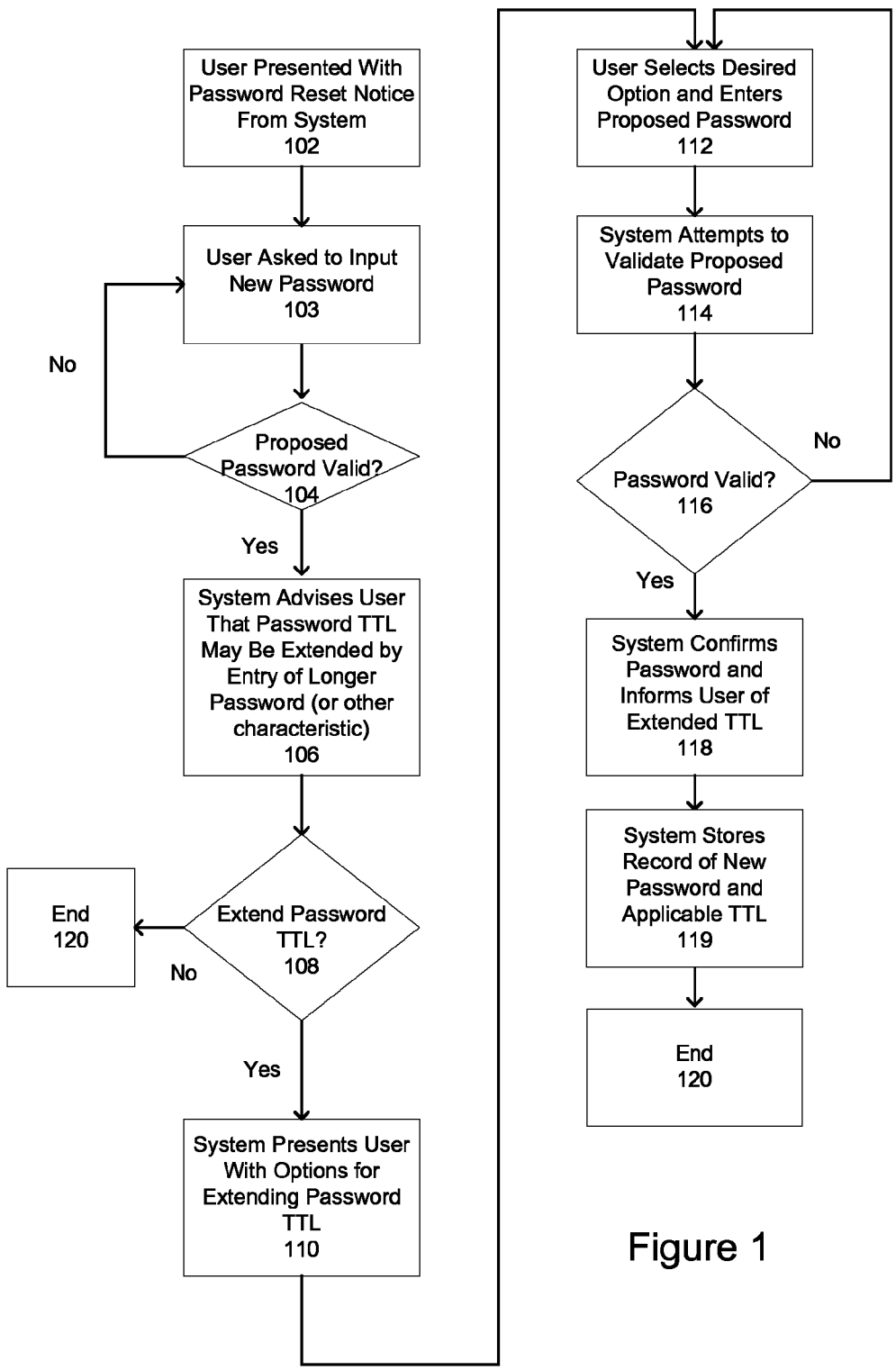
FIG. 1 is a flowchart or flow diagram illustrating an example method, process, function or operation that may be used to implement one or more aspects of an embodiment of the invention.

This description discusses illustrative embodiments of the inventive system and methods. It is presented with reference to the accompanying drawings in order to provide a person having ordinary skill in the relevant art with a full, clear, and concise description of the subject matter defined by the claims which follow, and to enable such a person to appreciate and understand how to make and use the invention. However, this description should not be read to limit the scope of the claimed subject matter, nor does the presence of an embodiment in this description imply any preference of the described embodiment over any other embodiment, unless such a preference is explicitly identified herein. It is the claims, not this description or other sections of this document or the accompanying drawings, which define the scope of the subject matter to which the inventor and/or the inventor's assignee(s) claim exclusive entitlement.

The subject matter of one or more embodiments of the invention is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying or requiring any particular order or arrangement among or between various steps or elements except when the order of individual steps or arrangement of elements is explicitly required.

Embodiments of the invention will be described more fully herein with reference to the accompanying drawings, which form a part hereof, and which show, by way of illustration, exemplary embodiments by which the invention may be implemented and practiced. The invention may, however, be embodied in different forms and should not be construed as limited to the embodiments set forth herein; rather, these embodiments are provided so that this disclosure will be thorough and complete, and will convey the scope of the invention to those skilled in the art.

Among other embodiments, the invention may be embodied in whole or in part as a system, as one or more processes, operations, methods, or functions, or as one or more apparatuses or devices. Embodiments of the invention may take the form of an entirely hardware implemented embodiment, an entirely software implemented embodiment or an embodiment combining software and hardware aspects. For example, in some embodiments, one or more of the operations, functions, processes, or methods described herein may be implemented by a suitable processing element (such as a processor, microprocessor, CPU, controller, etc.) that is programmed with a set of executable instructions (e.g., software instructions), where the instructions may be stored in a suitable data storage element. The processor, microprocessor, CPU or controller may be a component or element of a computing device or data processing device or platform, such as a client device, network work station, or a server used with an associated data storage element or database. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the invention are directed to systems, apparatuses, and methods for use in enhancing security for situations in which a password is required to access a device, application, network, data storage element, structure, system, or other suitable access control or security function, element, structure, or component. Specifically, embodiments of the present invention are directed to systems and methods for determining or assigning a password time-to-live (TTL) value and encouraging a user to create a more complex and presumably more secure password by extending the password TTL based on one or more characteristics of the password.

In one embodiment, a user is offered the opportunity to extend their password's TTL value by selecting a longer and/or more complex password. The user may be offered more than one option for an extended password TTL value as a function of the length and/or complexity of the proposed new password. For example, if the default password TTL is 90 days for a password of length six characters, then the user may be offered the option of a password TTL of 120 days for a new password of length eight characters, a password TTL of 150 days for a new password of length ten characters, etc.

In the same or another embodiment, a user may be offered a password TTL value option that is based on one or more factors or parameters in addition to (or instead of) the number of characters. The factors or parameters may be chosen to be those which increase the complexity of the password or are otherwise believed to provide enhanced security by reducing the likelihood of an unauthorized person guessing the password. Examples of this option include a longer password TTL value if the new password includes a certain type of character (such as a non-alphanumeric character), does not include a certain type of character, includes a certain minimum number of different characters, satisfies a certain threshold value when evaluated in terms of its complexity, obtains a certain minimum value when evaluated by a specified algorithm, rule or heuristic that is used to estimate the degree of security provided by the password, etc.

Note that use of the invention may require that a separate TTL value be stored and referred to for each account, as opposed to the current practice of having a standard TTL that is applied to all (or multiple) accounts. Further, the options presented to a user with regards to the password TTL value may depend upon the user's role in an organization, the systems, components, or types of data that the user typically accesses, the TTL suggested by application of a specific algorithm, rule or heuristic (which may vary depending upon the current state of applicable encryption/decryption or coding models, etc.), the current needs or requirements of the organization (such as a need for enhanced security due to a specific task or project), etc. Thus, the TTL options offered to a specific user may depend upon one or more factors, where these factors may change over time.

For example, access to financial data may require use of a password with a minimum TTL value that exceeds that required for other types of data or systems (and thus a password that is expected to be more secure than one used for other purposes). Access to a specific system or to a specific element or functionality of a system may require a more secure password than that required for other uses, and the options offered to a user for a password TTL value as a function of password characteristics may reflect those concerns. If the user's role in an organization is such that they would be expected to access confidential or proprietary data, then they may be required to use certain characteristics (or not use certain characteristics) in a password in order to obtain an extended TTL value. For example, this might include limiting IT or HR personnel to a certain minimum complexity value or difficulty level in "guessing" their password in order to qualify for an extended TTL value.

Similarly, the password TTL value(s) offered to a user might depend on the results of applying an encryption or coding model to a proposed password. This would operate to determine a possible password TTL value based on the outcome of applying the model to the proposed password (and hence determining a relative difficulty in "guessing" the proposed password or level of security expected to be provided by the password). In this embodiment, password TTL values offered to a user may be varied as new techniques are developed that operate to decrease the likelihood that a password could be guessed (such as new ways of generating or encoding a proposed password based on mathematical algorithms, etc.). Similarly, as new (malicious) methods are developed to more effectively "guess" passwords, the password TTL values offered to a user may be altered to offset the advantage gained by the new methods (such as by reducing the password TTL value offered for passwords of a type that are believed to be more prone to being guessed based on the new methods).

As noted, an embodiment of the invention may be utilized in a situation in which a password is used to control access to and usage of one or more of a system, device, apparatus, application, function, process, data, data storage element, etc.

In one embodiment, the invention may be implemented as a set of software instructions that are executed by a properly programmed computing or data processing device (e.g., a computer in which is installed an operating system that uses the invention to control access to the computer and/or its resources). Other environments in which an embodiment of the invention may be used will be apparent to one of skill in the art and may include networks, network devices, structures (such as a keypad used to access a building, safe, door, etc.), functions, etc.

Further, although the description herein may focus on use of a password that is typically represented as a string of characters (and is typically alphanumeric, with or without the addition of special characters), note that an embodiment of the invention may also be used as part of enabling a user to select other forms of security or access control codes. For example, an embodiment of the invention may be used to enable a user to select an image or combination of an image and a string of characters to be used as an access code, an auditory sequence of sounds, spoken sequence of words, letters, or sounds, etc.

FIG. 1 is a flowchart or flow diagram illustrating an example method, process, function or operation 100 that may be used to implement one or more aspects of an embodiment of the invention. The method, process, operation, or function(s) depicted in FIG. 1 may be implemented to control access to any suitable device or element, including but not limited to a desktop computer, a work station, a network, a system, a data storage element, a database, a data file, a folder, a software application, a function of an application, a portable computer, a tablet computer, a mobile phone, a structure, a door, etc. It is noted that although a set of steps or stages are depicted in FIG. 1, embodiments of the invention may utilize fewer than the depicted steps, a greater number of steps, or different steps in a particular implementation. It is understood that regardless of the specific steps or operations used in an implementation, it is the underlying concept of a variable password TTL, with a value that is determined based on a characteristic of a proposed password, which forms a basis for the invention.

Examples of suitable computing devices to which an embodiment of the invention may be applied include personal computers, work stations, server computers, desktop computers, laptop computers, notebook computers, personal digital assistants (PDAs), smart phones, cell phones, and consumer electronics incorporating one or more computing device components, such as one or more processors. Examples of suitable networks include networks that utilize wired and/or wireless communication technologies and networks operating in accordance with any suitable networking and/or communications protocol.

As an example, an embodiment of the invention may be used to provide access control for one or more client devices, databases, hard drives, networks, systems, services provided by a multi-tenant distributed computing service (or the entire data processing platform itself), software applications, data storage elements, data files, etc. Further, the embodiment used for each of the possible implementation scenarios may be different in terms of the TTL options available to a user, the characteristics of a password required to produce a certain TTL value that is offered to a user, etc.

As shown in FIG. 1, at step or stage 102 a user of a device, network, system, software application, service, or other suitable element is notified that their existing password is due to expire, and that a new password will be required for continued access (note that a variation of this situation is one in which a new user to a system is asked to replace a temporary password with a user-specific one). The existing password's TTL may have been set by a system administrator, security personnel, security policy, etc. For example, the existing password may have an associated TTL of 90 days. At stage 103 the user may be requested to input a new password. The user may also be provided with rules or hints regarding the characteristics that the password should have in order to be accepted as valid. These may include a minimum length, the inclusion of one of a certain set of characters (such as "special" non-alphanumeric characters), the exclusion of certain sequences of characters, etc.

At stage 104 the system may perform one or more validation tests on the proposed new password. If the proposed password is determined to be valid (corresponding to the "Yes" branch of stage 104), then the system may also advise the user that the time-to-live (TTL) or lifetime of the new password may be extended using a longer password or one having another characteristic (stage 106). The system may also provide the user with examples of how an increased length (or other characteristic) will extend the TTL of a new password (such as a table showing each of several password lengths (e.g., 6, 8, 10, etc. characters) and an associated password TTL (e.g., 90 days, 102 days, 150 days, etc.). If the proposed password is determined to not be valid (corresponding to the "No" branch of stage 104), then control passes back to stage 103 and the user is requested to input a new proposed password.

Note that although the password length (or number of characters) is used here as an example, other characteristics may also be used as the basis for extending the TTL of a password. Such characteristics may include one or more of the inclusion of certain characters or symbols (e.g., mathematical, Greek, logical, non-alphanumeric, etc.), the inclusion of certain fonts or typefaces, the inclusion of more than one font or typeface, a level of complexity as determined by application of a specified algorithm or heuristic (so that one or more password TTL values may be offered to a user based on the result of evaluating a proposed password using a specific technique, algorithm, rule, heuristic, process, etc.), etc. Further, note that the amount of time by which a password TTL may be extended may be a function of the device, data, system, network, application, or other element to which the password is to be applied. Thus for certain uses one set of possible TTLs and requirements (password characteristics) may apply, while for a different use a second set of possible TTLs and requirements (password characteristics) may apply. This permits a system administrator to establish different security policies depending on the level of security desired for different users and/or for different aspects of a system or network.

Thus in some embodiments, the password TTL value or values offered to a user (and hence applied to a system, component, process, network, etc.) may be a function of one or more of the following factors or aspects:
- the user's role in an organization;
- the specific component, element, data, network to which the password will be applied;
- the project or task for which access to the component, etc. is desired; and
- the expected level of security provided by a proposed password as determined by evaluating the proposed password using a specific algorithm, process, heuristic, rule, coding model, encryption method, etc.

At stage 108, the system may ask the user if they wish to have the opportunity to extend their password's TTL by entering a different (e.g., longer, more complex, more secure, etc.) password. If the user responds "No", then the process terminates (as depicted by "End" stage 120) and the previously entered new password is accepted (i.e., if it passed the validation test(s)). However, if the user responds "Yes", then the system may present the user with one or more options for extending their password's TTL (stage 110). These may include a list or table showing possible password characteristics (one or more of length, complexity, use of multiple fonts, inclusion of a symbol from a certain character set or language, result of evaluating a proposed password using a specific security method or protocol, etc.) and the associated password TTL value to which such a password would be entitled. For example, the list presented to the user may appear as follows:

| Password Length (characters) | Symbol Included | More than one font? | Password TTL (days) |
| --- | --- | --- | --- |
| 6 | N | N | 90 |
| 6 | Y | N | 100 |
| 6 | Y | Y | 120 |
| 8 | N | N | 120 |
| 8 | Y | N | 130 |
| 8 | Y | Y | 150 |
| 10 | N | N | 150 |

Note that the above examples are not to be interpreted as either exhaustive or limiting; other types or combinations of password characteristics may be considered and associated with different TTL values. Note also that as mentioned, the specific options of password characteristic and TTL presented to a user may depend on the desired level of security applicable to the system, network, device, service, application, data, function, etc. being considered and/or to the characteristics of the user. At stage 112, the user selects a desired password/TTL value option and enters a new proposed password. The system then performs one or more validation tests on the new proposed password (stage 114). If the new proposed password is not valid (the "No" branch of stage 116, i.e., it fails to satisfy at least one of the specified criteria or tests), then control returns to stage 112 and the user is requested to select the desired option and enter a new proposed password. If the new proposed password is valid (the "Yes" branch of stage 116), then the system confirms the new password and informs the user of the extended TTL period (stage 118). The system then stores the new password and applicable TTL period for use when it is time to remind the user of the need to set a new password (stage 119). As noted, as a result of using an embodiment of the invention, the TTL value may vary for different users. The process then ends (stage 120).

Figure 2:
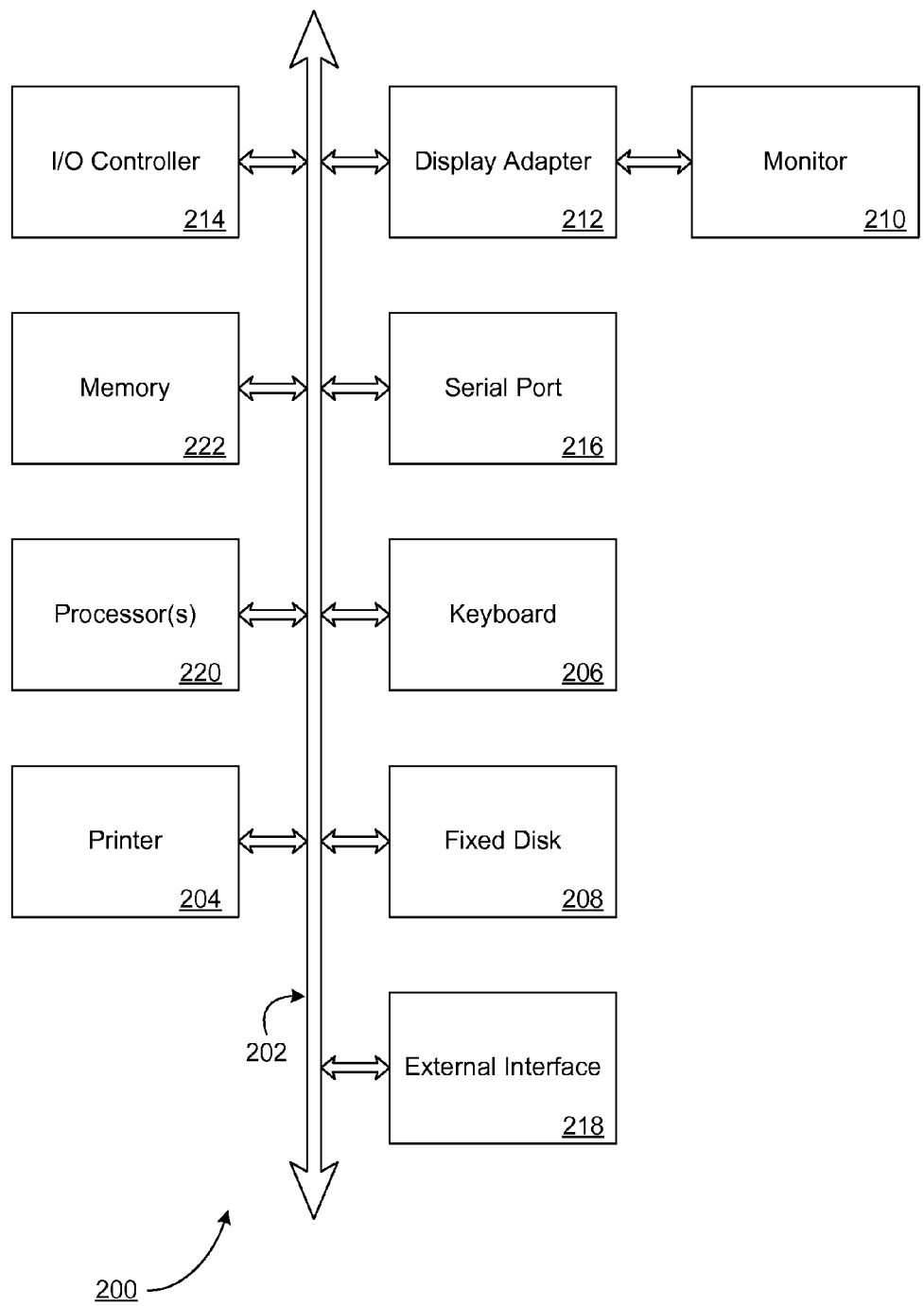
FIG. 2 is a diagram illustrating elements or components that may be present in a computing or data processing device or system configured to implement a method, process, function or operation in accordance with an embodiment of the invention.

FIG. 2 is a diagram illustrating elements or components that may be present in a computing or data processing device or system configured to implement a method, process, function or operation in accordance with an embodiment of the invention (such as part of all of the process illustrated in FIG. 1). Note that the system, device, or environment depicted in FIG. 2 is only one example of a situation in which an embodiment of the invention may be used or which may be used to implement an embodiment of the invention. As discussed herein, an embodiment may be used for controlling access to one or more of the elements in (or processes of) a computing device, computing system, server, communications network, service platform, data processing network, data storage element, structure, building, location, etc. An embodiment of the invention may be implemented as a process, method, function, or operation of a system or device by an operating system, network controller, dedicated security application, etc. Typically, an embodiment will be implemented as a set of software instructions that may be executed by a suitable programmed processor, microprocessor, central processing unit (CPU), controller, or other suitable element.

As mentioned, in accordance with one embodiment of the invention, the system, apparatus, methods, processes, functions, or operations for enhancing security by extending the time-to-live (TTL) value of a password may be wholly or partially implemented in the form of a set of instructions executed by one or more programmed computer processors such as a central processing unit (CPU) or microprocessor. Such processors may be incorporated in an apparatus, device, server, client or other computing device operated by, or in communication with, other components of the system. As an example, FIG. 2 illustrates elements or components that may be present in a computing or data processing device or system 200 configured to implement a method, process, function or operation in accordance with an embodiment of the invention. The subsystems shown in FIG. 2 are interconnected via a system bus 202. Additional subsystems include a printer 204, a keyboard 206, a fixed disk 208, and a monitor 210, which is coupled to a display adapter 212. Peripherals and input/output (I/O) devices, which couple to an I/O controller 214, can be connected to the computer system by any number of means known in the art, such as a serial port 216. For example, the serial port 216 or an external interface 218 can be utilized to connect the computer device 200 to further devices and/or systems not shown in FIG. 2 including a wide area network such as the Internet, a mouse input device, and/or a scanner. The interconnection via the system bus 202 allows one or more processors 220 to communicate with each subsystem and to control the execution of instructions that may be stored in a system memory 222 and/or the fixed disk 208, as well as the exchange of information between subsystems. The system memory 222 and/or the fixed disk 208 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, standard or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context.

The terms "having," "including," "containing" and similar referents in the specification and in the following claims are to be construed as open-ended terms (e.g., meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A computer-implemented method, comprising: providing a device configured to control access to one or more functions of the device, wherein access is based on submission and verification of an appropriate password; providing a user with one or more options for a time-to-live value for a password submitted by the user, wherein the one or more options are dependent upon a characteristic of the password submitted by the user; receiving, at the device a selection by the user of one of the one or more options; receiving, at the device, the password from the user; evaluating the password to determine if it satisfies one or more criteria applicable to the selected option, wherein at least one of the one or more criteria is based upon a role of the user; if the password satisfies the one or more criteria applicable to the selected option, then setting a password time-to-live value for the user to the time-to-live-value corresponding to the selected option; and changing operation of the access control for the device in response to the time-to-live-value corresponding to the selected option.

2. The method of claim 1, wherein the one or more characteristics of the password include one or more of a length of the password, the inclusion or exclusion of a certain character or characters, or a level of complexity of the password as determined by an algorithm heuristic, rule, or method.

3. The method of claim 1, wherein providing the user with the one or more options for the time-to-live value for the password further comprises providing the user with one or more options for the time-to-live value for the password based on one or more of the role of the user in an organization or the device, process, or system to which the password will be applied.

4. The method of claim 1, wherein evaluating the password to determine if it satisfies the one or more criteria applicable to the selected option further comprises evaluating the password by application of an algorithm, heuristic, rule, or method to the password.

5. The method of claim 1, wherein the one or more options for the time-to-live value for the password include an option for a longer time-to-live value if the password satisfies a condition related to application of a specific algorithm, heuristic, rule, or process.

6. The method of claim 5, wherein the specific algorithm, heuristic, rule, or process provides an indication of an expected security level applicable to the password.

7. The method of claim 1, wherein the password comprises one or more of a string of characters, an image, a sequence of sounds, or a spoken word or words.

8. The method of claim 1, wherein prior to providing the user with the one or more options for the time-to-live value for the password, the method further comprises providing the user with an indication that a current password is due to expire.

9. The method of claim 1, further comprising storing a record of the password time-to-live value corresponding to the selected option, the record including an association of the password time-to-live value with the user.

10. An apparatus, comprising:
a processor programmed to execute a set of instructions;
a data storage element in which the set of instructions are stored, wherein when executed by the processor the set of instructions cause the apparatus to
secure data stored in the data storage with a password;
provide a user of a computer with one or more options for a time-to-live value for the password based on one or more characteristics of the password;
receive a selection by the user of one of the one or more options;
receive the password;
evaluate the password to determine if it satisfies one or more criteria applicable to the selected option, at least one criterion based upon a role of the user; and
if the password satisfies the one or more criteria applicable to the selected option, then setting the password time-to-live value for the password provided by the user to the time-to-live value corresponding to the selected option; and
change a manner of securing the computer with the password in response to the time-to-live-value corresponding to the selected option.

11. The apparatus of claim 10, wherein the one or more characteristics of the password include one or more of a length of the password, the inclusion or exclusion of a certain character or characters, or a level of complexity of the password as determined by an algorithm heuristic, rule, or method.

12. The apparatus of claim 10, wherein providing the user with the one or more options for the time-to-live value for the password further comprises providing the user with one or more options for the time-to-live value for the password based on one or more of the role of the user in an organization or the device, process, or system to which the password will be applied.

13. The apparatus of claim 10, wherein evaluating the password to determine if it satisfies the one or more criteria applicable to the selected option further comprises evaluating the proposed password by application of an algorithm, heuristic, rule, or process to the proposed password.

14. The apparatus of claim 10, wherein the one or more options for the time-to-live value for the password include an option for a longer time-to-live value if the password satisfies a condition related to application of a specific algorithm, heuristic, rule, or process.

15. The apparatus of claim 14, wherein the specific algorithm, heuristic, rule, or process provides an indication of an expected security level applicable to the password.

16. The apparatus of claim 10, wherein the password is one or more of a string of characters, an image, a sequence of sounds, or a spoken word or words.

17. A computer-implemented method of providing access, comprising: securing data stored in a memory on a computer with password protection; presenting a user with an option to extend a password time-to-live value based on the user submitting a password that satisfies one or more criteria; receiving from the user a selection of the option; receiving from the user the password; determining if the password satisfies the one or more criteria, at least one criterion based upon a role of the user; accepting the password as a new password if the password satisfies the one or more criteria; setting the time-to-live value for the new password corresponding to the selected option; at a later time, requesting the user to submit an entered password; and providing the user with access to the data stored in the memory if the entered password is the new password.

18. The method of claim 17, wherein the one or more criteria include one or more:
a length of the password;
a character that is part of the password;
a character that is not part of the password;
a complexity of the password; or
a level of security associated with the password.

19. The method of claim 18, wherein the complexity or the level of security associated with the password is determined based on application of one or more of a method, process, rule, heuristic, or algorithm to the password.

20. The method of claim 17, wherein the option to extend the password time-to-live value presented to the user is based on one or more of the role of the user in an organization or the device, process, or system to which the password will be applied.

21. The method of claim 17, wherein presenting the user with an option to extend the password time-to-live value further comprises presenting the user with a plurality of options, wherein each option is associated with a specific time-to-live value based on one or more characteristics of the password.

22. The method of claim 17, wherein providing the user with access if the entered password is the new password further comprises providing the user with access to one or more of a device, a system, a network, a process, a data file, a data storage element, a structure, or a building.

\* \* \* \* \*